UNITED STATES PATENT OFFICE.

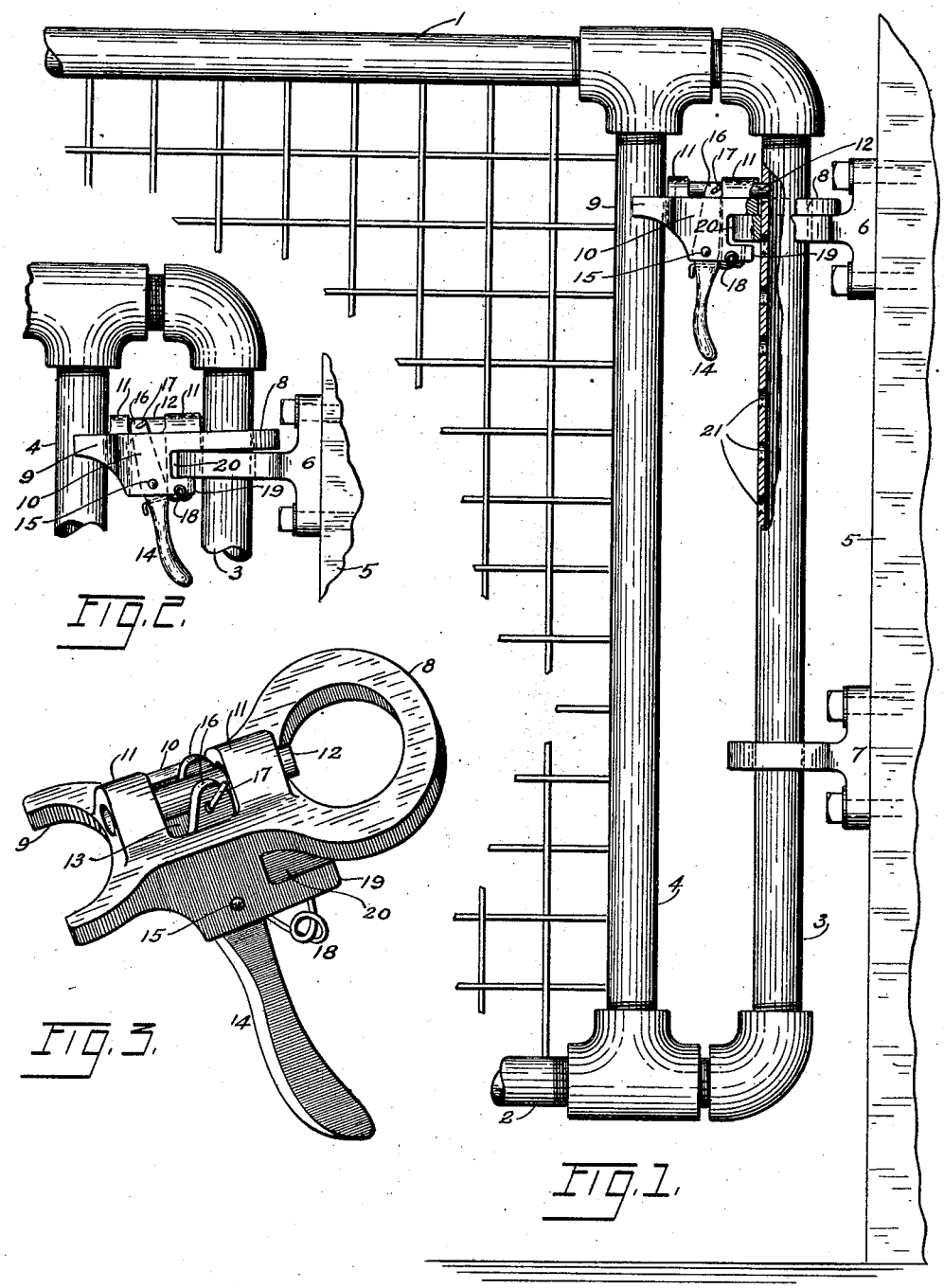

CHARLES B. BAUMGARTNER, OF ROCHELLE, ILLINOIS.

GATE.

No. 915,407.  Specification of Letters Patent.  Patented March 16, 1909.

Application filed May 12, 1908. Serial No. 432,512.

*To all whom it may concern:*

Be it known that I, CHARLES B. BAUMGARTNER, a citizen of the United States, residing at Rochelle, in the county of Ogle and State of Illinois, have invented certain new and useful Improvements in Gates, of which the following is a specification.

The object of this invention is to construct a gate which can be supported at different elevations without interfering with its swinging movements.

In the accompanying drawings, Figure 1 is a side elevation of the hinged end of a gate showing the supporting means partly in section. Fig. 2 is a side elevation of the upper portion of the gate in which the plunger is withdrawn and the gate supported by the cramping action of the connecting parts. Fig. 3 is a perspective view of the plunger and its support.

Only that portion of the gate is shown which has a connection with a suitable support, and comprises the upper bar 1, lower bar 2, end bar 3, and an intermediate end bar 4 extending parallel with the end bar 3.

To the support 5, for instance a post, are secured two eyes 6 and 7, which are separated a suitable distance. The bar 3 is located in the eyes 6 and 7 which serve as a guide for the gate and its swinging movements. The eyes permit the end-bar 3 to slide vertically through them in order that the gate may be raised to different elevations. My improvements have relation to the means for supporting the gate in its adjusted positions.

A plunger support comprises the eye portion 8 and fork portion 9 connected by a center portion 10. From the center portion 10 extends two perforated ears 11 in which a plunger 12 is located. Between the ears 11 is formed a vertical opening 13 within which is located a lever 14, and pivoted in place by the pin 15. The upper end of this lever is forked and the branches 16 receive the plunger between them and pivoted thereto by the pin 17. A spring 18 has one end embracing the lever 14 and its other end is connected to the center portion 10 of the plunger support. Beneath the eye portion 8 and from the center portion 10 extends a lip 19, leaving a space 20 of greater width than the thickness of the upper eye 6. The end-bar 3 of the gate passes through the eye portion 8 of the plunger support, and the forked end 9 receives the intermediate end-bar 4. The upper eye 6 has a portion located in the space 20 between the eye portion 8 and the lip 19.

When the parts are in the position shown at Fig. 1, the end of the plunger 12 is located in one of the series of holes 21 in the inner face of the end-bar 3. When the plunger 12 is in one of the holes 21 in the end-bar 3, the under face of the eye portion 8 will rest in contact with the upper face of the eye 6, thereby forming a support for the gate. When the gate is thus supported it can be swung to either side, the fork portion 9 embracing the intermediate end-bar 4 will carry the plunger with the gate so that the plunger will always be in position to enter the holes 21. In raising the gate the lever 14 is moved on its pivot which will withdraw the plunger from one of the holes 21 in the end bar 3 the gate can then be raised by moving the end bar 3 through the eyes 6, 7 and 8. The lip 19 will engage the surface of the eye 6 and prevent the raising of the plunger and its support.

The gate can be lowered by withdrawing the plunger from its engagement with the end bar 3. The gate will drop a short distance which will cramp the plunger support in connection with the eye 6 as shown at Fig. 2. This cramping action will hold the gate from dropping. By raising the outer end of the gate, the cramp will be taken out of the plunger support which will let the gate drop. The gate may drop with sufficient rapidity so that the plunger may pass one or more of the holes 21 before it will enter one of the holes 21.

I claim as my invention.

1. A gate comprising an end bar formed with a series of holes and an intermediate bar located parallel with the end bar, two eyes receiving the end bar, a support provided with an opening through which the end bar passes, and a fork receiving the intermediate bar, a lip extending from the support and located parallel with the eye thereof and adapted to receive one of the eyes, a plunger movable in the support and adapted to enter the holes, and a lever for moving the plunger.

2. A gate comprising an end bar formed with a series of holes and an intermediate bar located parallel with the end bar, two eyes receiving the end bar, a support provided with an opening through which the end bar passes, and a fork receiving the intermediate bar, a lip extending from the support and located parallel with the eye thereof and adapted to receive one of the eyes, a plunger movable in the support and adapted to enter the holes, and a spring actuated lever for moving the plunger.

In testimony whereof I have hereunto set my hand in presence of two subscribing witnesses.

CHARLES B. BAUMGARTNER.

Witnesses:
H. A. OTIS,
L. F. WIENEKE.